(12) United States Patent
Wolk et al.

(10) Patent No.: US 11,835,004 B2
(45) Date of Patent: Dec. 5, 2023

(54) METHOD FOR DETERMINING PILOT INJECTION MASS

(71) Applicants: Tula Technology, Inc., San Jose, CA (US); Cummins, Inc., Columbus, IN (US)

(72) Inventors: Benjamin Wolk, Oakland, CA (US); Justin Lee, Brownsburg, IN (US); Timothy Hayden Shipp, Seymour, IN (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/723,581

(22) Filed: Apr. 19, 2022

(65) Prior Publication Data

US 2022/0235718 A1     Jul. 28, 2022

Related U.S. Application Data

(63) Continuation of application No. 17/406,547, filed on Aug. 19, 2021.

(60) Provisional application No. 63/082,968, filed on Sep. 24, 2020.

(51) Int. Cl.
*F02D 41/00* (2006.01)
*F02D 41/30* (2006.01)
*F02D 41/40* (2006.01)

(52) U.S. Cl.
CPC ......... *F02D 41/008* (2013.01); *F02D 41/009* (2013.01); *F02D 41/3011* (2013.01); *F02D 41/403* (2013.01); *F02D 2200/021* (2013.01); *F02D 2200/0614* (2013.01)

(58) Field of Classification Search
CPC ................. F02D 41/008; F02D 41/009; F02D 41/3011; F02D 41/403; F02D 2200/021; F02D 2200/0614; F02D 41/401; F02D 35/026; F02D 41/402; F02D 41/0087; Y02T 10/40
See application file for complete search history.

(56) References Cited

U.S. PATENT DOCUMENTS

| | | | |
|---|---|---|---|
| 6,390,058 B1 | 5/2002 | Takahashi et al. | |
| 7,577,511 B1 | 8/2009 | Tripathi et al. | |
| 7,703,440 B2 * | 4/2010 | Hatano | F02D 35/023 |
| | | | 123/299 |
| 7,849,835 B2 | 12/2010 | Tripathi et al. | |
| 7,886,715 B2 | 2/2011 | Tripathi et al. | |

(Continued)

FOREIGN PATENT DOCUMENTS

| | | | | |
|---|---|---|---|---|
| CA | 2798599 A1 * | 2/2013 | ............ | F02D 17/02 |
| EP | 3311016 B1 | 5/2019 | | |

(Continued)

OTHER PUBLICATIONS

International Search Report and Written Opinion dated Dec. 9, 2021 in PCT/US2021/046641.

(Continued)

*Primary Examiner* — Joseph J Dallo
(74) *Attorney, Agent, or Firm* — Womble Bond Dickinson US (LLP)

(57) ABSTRACT

A variety of methods and arrangements are described for determining a pilot injection mass during skip fire operation of an internal combustion engine.

22 Claims, 7 Drawing Sheets

(56) References Cited

U.S. PATENT DOCUMENTS

| | | |
|---|---|---|
| 7,954,474 B2 | 6/2011 | Tripathi et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,616,181 B2 | 12/2013 | Sahandiesfanjani et al. |
| 8,701,628 B2 | 4/2014 | Tripathi et al. |
| 9,086,020 B2 | 7/2015 | Pirjaberi et al. |
| 9,120,478 B2 | 9/2015 | Carlson et al. |
| 9,200,575 B2 | 12/2015 | Shost |
| 9,200,587 B2 | 12/2015 | Serrano |
| 9,239,037 B2 | 1/2016 | Carlson et al. |
| 9,267,454 B2 | 2/2016 | Wilcutts et al. |
| 9,273,643 B2 | 3/2016 | Carlson et al. |
| 9,291,106 B2 | 3/2016 | Switkes et al. |
| 9,328,672 B2 | 5/2016 | Serrano et al. |
| 9,650,971 B2 | 5/2017 | Pirjaberi et al. |
| 9,664,130 B2 | 5/2017 | Wilcutts et al. |
| 9,945,313 B2 | 4/2018 | Kotwicki et al. |
| 10,247,121 B2 | 4/2019 | Shost et al. |
| 10,619,584 B2 | 4/2020 | Fuschetto et al. |
| 2002/0040692 A1 | 4/2002 | LaPointe et al. |
| 2005/0092303 A1 | 5/2005 | Oki |
| 2006/0219214 A1 | 10/2006 | Okude et al. |
| 2006/0243243 A1 | 11/2006 | Fukasawa |
| 2007/0015630 A1 | 1/2007 | Miyazaki |
| 2008/0172169 A1 | 7/2008 | Kuronita et al. |
| 2009/0151697 A1 | 6/2009 | Hatano et al. |
| 2019/0136791 A1* | 5/2019 | Kurtz ............... F02D 41/062 |
| 2019/0211755 A1 | 7/2019 | Doui |
| 2020/0200119 A1 | 6/2020 | Matsuo et al. |
| 2021/0003088 A1* | 1/2021 | Chen ................ F02D 41/008 |
| 2022/0090548 A1 | 3/2022 | Wolk et al. |

FOREIGN PATENT DOCUMENTS

| | | | |
|---|---|---|---|
| WO | 2009087715 A1 | 7/2009 | |
| WO | WO-2016203095 A1 * | 12/2016 | ............. F02D 17/02 |

OTHER PUBLICATIONS

International Preliminary Report on Patentability for PCT/US2021/046641 dated Mar. 28, 2023, 7 pages.

* cited by examiner

| Varible | Estimate Method A | Method B | Method C |
|---|---|---|---|
| m_Charge | Existing Charge Flow Estimator/Virtual Sensor | Measured Flow Rates (Mass Air Flow Sensor, EGR ΔP + Flow Equation) | |
| C_P | Constant Value for Typical Composition/ Temperature at TDC | Estimate of Chemical Composition (from Air/Fuel/EGR Rates) and Temperature & c_p for Each Species (Very Complicated); Could Also Use Weighted Average of a Air in EGR, etc | |
| LHV_Fuel | Constant Value for Diesel Fuel (Good Enough, Even for Different Diesel Fuel) | | |
| n_Comb (Comb Effic.) | Constant Value, e.g. 99%, Expert for Cold Start (How Much Pilot Gets Converted into T) | Lookup Table Based on Engine Speed, EGR, Coolant Temp., etc. (Cold have Diff.); Could have Approach for Cold Starts, but won't Use Cyl. Deact. when Very Cold) | Could have Look-up Table that Quantifies How Pilot Burns as a Fct. of Engine Speed/EGR Amt./Coolant Temp., but Might be too Complic |
| T_Desired | Single Zone Physical Model W/ Wall HT and Blowby, 1st Skip Value at TDC | Lookup Table for Temperature Drop per Skip (e.g. Function of Engine Speed, Coolant Temperature, etc)* Number of Skips | Note: (T_Desired − T_Estimated) Can be Estimated Instead of Each Separately, Fixed Temperature Drop Per Skip Number of Skips (50k/Skip) |
| T_Estimated | Single Zone Physical Model W/ Wall HT and Blowby, Current Cycle Value | | |

FIG. 7

METHOD FOR DETERMINING PILOT INJECTION MASS

CROSS-REFERENCE TO RELATED APPLICATIONS

The present application is a continuation of U.S. patent application Ser. No. 17/406,547, filed Aug. 19, 2021, which claims priority to U.S. Provisional Patent Application Ser. No. 63/082,968, filed Sep. 24, 2020. The entire contents of each of these applications are hereby incorporated by reference.

FIELD OF THE INVENTION

This present invention relates generally to the skip fire operation of a diesel engine, and more specifically to determining a pilot injection mass for re-fired cylinders in a diesel engine operating in skip fire mode.

BACKGROUND OF THE INVENTION

Fuel efficiency of many types of internal combustion engines can be improved by varying the displacement of the engine. This allows for the use of full displacement when full torque is required and the use of a smaller displacement when full torque is not required. Engines that use standard cylinder deactivation (CDA) reduce engine displacement by deactivating subsets of cylinders. For example, an eight-cylinder engine can reduce its displacement by half by deactivating four cylinders. Likewise, a four-cylinder engine can reduce its displacement by half by deactivating two cylinders, or a six-cylinder engine can reduce its displacement to ⅓ by deactivating four cylinders. In all of these cases, the deactivated cylinders do not fire while the engine is operated at this reduced level of displacement. The firing patterns that arise in CDA are called fixed patterns, because the cylinders which skip are fixed during the entire time the engine is at that level of reduced displacement.

In contrast, engines that use skip-fire can reduce engine displacement to other levels by deactivating one or more cylinders for one engine cycle, then firing these cylinders the next cycle, then skipping or firing them on a third cycle. In this method, for example, an eight-cylinder or four-cylinder engine can reduce its displacement to ⅓ by having each cylinder repeatedly skip, then fire, then skip. This reduction in engine displacement cannot be attained simply by deactivating a fixed subset of cylinders. The firing patterns that arise in skip-fire are called rolling patterns, because the cylinders that deactivate change each cycle causing the pattern of skips and fires to roll across the cylinders over time. An engine cycle is generally defined as the time required for all cylinders to complete the four distinct piston strokes (intake, compression, power/expansion, and exhaust), which generally requires two (2) rotations of the crankshaft (720 degrees) for a 4-stroke engine commonly used to supply motive power to a vehicle.

One issue that arises in a diesel engine using skip-fire is that cylinders that are skipped while being used as an air spring can experience progressive drops in compressed gas temperature at top dead center (TDC) due to heat losses. When the skipped cylinders are re-fired, the lower gas temperature leads to longer ignition delays which can cause late, unstable, and/or inefficient combustion or misfire, which can increase hydrocarbon emissions.

SUMMARY

In at least one embodiment of this invention, a pilot injection mass is injected before the main fuel injection in order to reduce an ignition delay. At least one embodiment of the invention is directed to determining the size of the pilot injection mass.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 7 shows some of the methods that can be used to calculate the variables used to compute the pilot mass.

DETAILED DESCRIPTION

Figure 1:
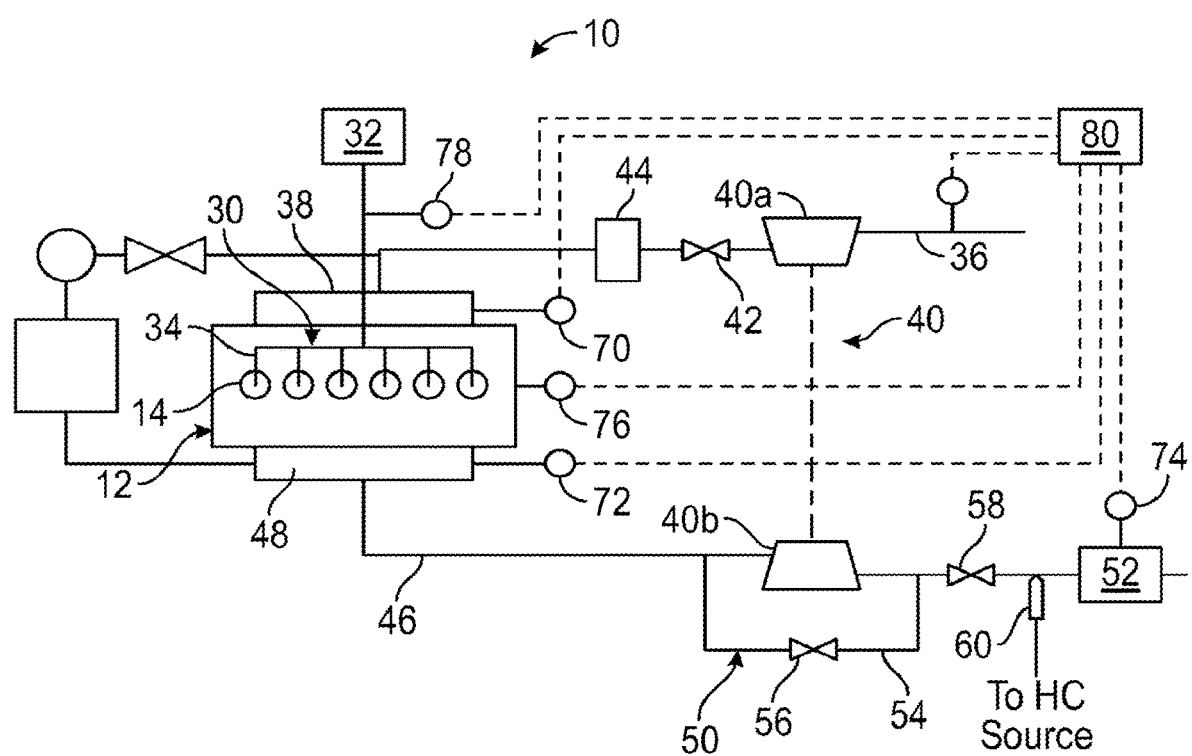
FIG. 1 shows a schematic of an internal combustion engine system.

The subject innovation is now described with reference to the drawings, wherein like reference numerals are used to refer to like elements throughout. In the following description, for purposes of explanation, numerals specific details are set forth in order to provide a thorough understanding of the present invention. It may be evident, however, that the present invention may be practiced without these specific details.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 10 includes a four-stroke internal combustion engine 12. FIG. 1 illustrates an embodiment where the engine 12 is a diesel engine, but any engine type is contemplated, including compression ignition, spark-ignition (SI), an engine that combines spark ignition with compression ignition, or an engine that ignites the air fuel mixture with a different technology. The engine 12 can include a plurality of cylinders 14. FIG. 1 illustrates the plurality of cylinders 14 in an arrangement that includes six cylinders in an in-line arrangement for illustration purposes only. Any number of cylinders and any arrangement of the cylinders suitable for use in an internal combustion engine can be utilized. The number of cylinders 14 that can be used can range from one cylinder to eighteen or more. Furthermore, the following description at times will be in reference to one of the cylinders 14. It is to be realized that corresponding features in reference to the cylinder 14 described in FIG. 2 and at other locations herein can be present for all or a subset of the other cylinders of engine 12.

Figure 2:
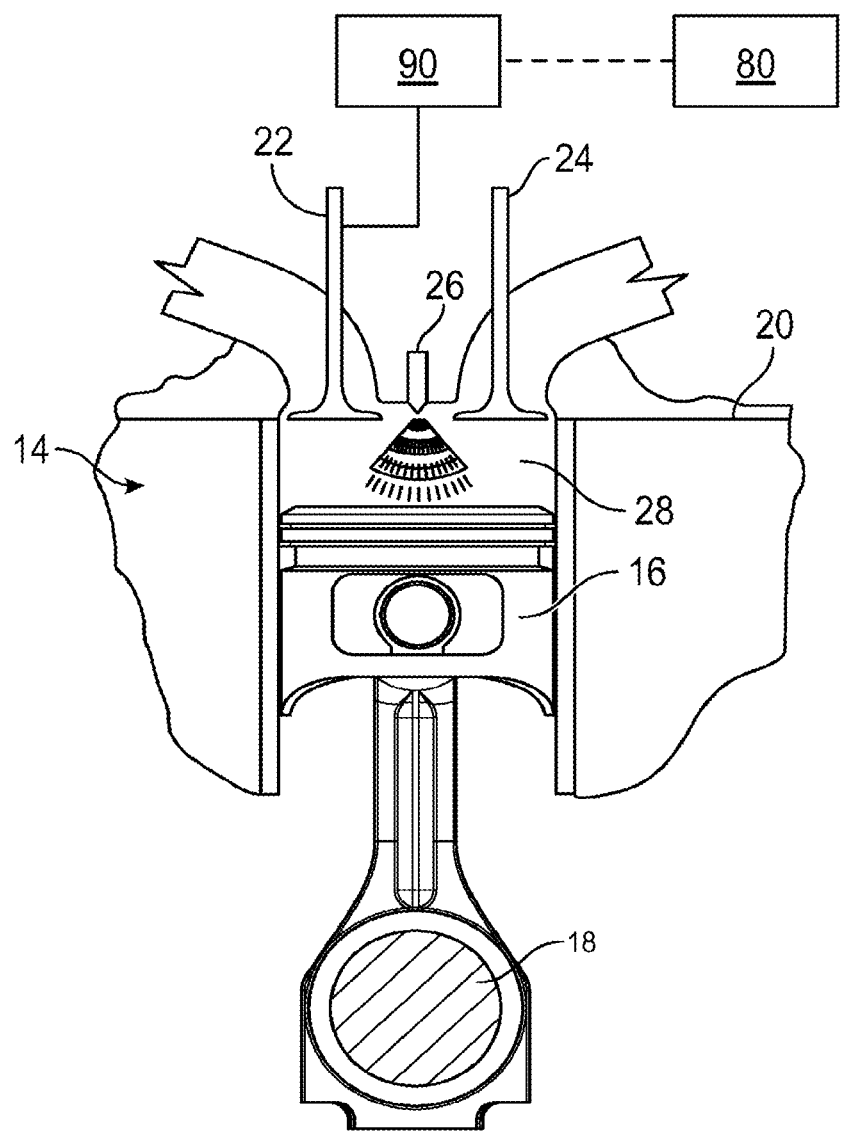
FIG. 2 is a schematic of a cylinder of the engine of the system of FIG. 1.

As shown in FIG. 2, the cylinder 14 houses a piston 16 that is operably attached to a crankshaft 18 that is rotated by reciprocal movement of piston 16 in cylinder 14. Within a cylinder head 20 of the cylinder 14, there is at least one intake valve 22, at least one exhaust valve 24 and a fuel injector 26 that provides fuel to a combustion chamber 28 formed by cylinder 14 between the piston 16 and the cylinder head 20. In other embodiments, fuel can be provided to combustion chamber 28 by port injection, or by injection in the intake system, upstream of combustion chamber 28.

The term "four-stroke" herein means the following four strokes—intake, compression, power, and exhaust—that the piston 16 completes during two separate revolutions of the engine's crankshaft 18. A stroke begins either at a top dead center (TDC) when the piston 16 is at the top of cylinder head 20 of the cylinder 14, or at a bottom dead center (BDC), when the piston 16 has reached its lowest point in the cylinder 14.

During the intake stroke, the piston 16 descends away from cylinder head 20 of the cylinder 14 to a bottom (not shown) of the cylinder, thereby reducing the pressure in the combustion chamber 28 of the cylinder 14. In the instance where the engine 12 is a diesel engine, a combustion charge is created in the combustion chamber 28 by an intake of air through the intake valve 22 when the intake valve 22 is opened.

As shown in FIG. 1, the fuel from the fuel injector 26 is supplied by a high pressure common-rail system 30 that is connected to the fuel tank 32. Fuel from the fuel tank 32 is suctioned by a fuel pump (not shown) and fed to the common-rail fuel system 30. The fuel fed from the fuel pump is accumulated in the common-rail fuel system 30, and the accumulated fuel is supplied to the fuel injector 26 of each cylinder 14 through a fuel line 34. The accumulated fuel in common rail system can be pressurized to boost and control the fuel pressure of the fuel delivered to combustion chamber 28 of each cylinder 14.

During the compression stroke, both the intake valve 22 and the exhaust valve 24 are closed, the piston 16 returns toward TDC and fuel is injected near TDC in the compressed air in a main injection event, and the compressed fuel-air mixture ignites in the combustion chamber 28 after a short delay. In the instance where the engine 12 is a diesel engine, this results in the combustion charge being ignited. The ignition of the air and fuel causes a rapid increase in pressure in the combustion chamber 28, which is applied to the piston 16 during its power stroke toward the BDC. Combustion phasing in combustion chamber 28 is calibrated so that the increase in pressure in combustion chamber 28 pushes piston 16, providing a net positive in the force/work/power of piston 16.

During the exhaust stroke, the piston 16 is returned toward TDC while the exhaust valve 24 is open. This action discharges the burnt products of the combustion of the fuel in the combustion chamber 28 and expels the spent fuel-air mixture (exhaust gas) out through the exhaust valve 24.

The intake air flows through an intake passage 36 and intake manifold 38 before reaching the intake valve 22. The intake passage 36 may be connected to a compressor 40a of a turbocharger 40 and an optional intake air throttle 42. The intake air can be purified by an air cleaner (not shown), compressed by the compressor 40a and then aspirated into the combustion chamber 28 through the intake air throttle 42. The intake air throttle 42 can be controlled to influence the air flow into the cylinder.

The intake passage 36 can be further provided with a cooler 44 that is provided downstream of the compressor 40a. In one example, the cooler 44 can be a charge air cooler (CAC). In this example, the compressor 40a can increase the temperature and pressure of the intake air, while the CAC 44 can increase a charge density and provide more air to the cylinders. In another example, the cooler 44 can be a low temperature aftercooler (LTA). The CAC 44 uses air as the cooling media, while the LTA uses coolant as the cooling media.

The exhaust gas flows out from the combustion chamber 28 into an exhaust passage 46 from an exhaust manifold 48. The exhaust passage 46 is connected to a turbine 40b and a wastegate 50 of the turbocharger 40. Exhaust gas then flows into an aftertreatment system 52 that includes one or more aftertreatment devices. The exhaust gas that is discharged from the combustion chamber 28 drives the turbine 40b to rotate. The wastegate 50 is a device that enables part of the exhaust gas to by-pass the turbine 40b through a passageway 54. Less exhaust gas energy is thereby available to the turbine 40b, leading to less power transfer to the compressor 40a. Typically, this leads to reduced intake air pressure rise across the compressor 40a and lower intake air density/flow. The wastegate 50 can include a control valve 56 that can be an open/close valve, or a full authority valve allowing control over the amount of by-pass flow or anything between.

The exhaust passage 46 can further or alternatively include an exhaust throttle 58 for adjusting the flow of the exhaust gas through the exhaust passage 46. The exhaust gas, which can be a combination of by-passed and turbine flow, then enters the aftertreatment system 52.

Optionally, a part of the exhaust gas can be recirculated into the intake air via an exhaust gas recirculation (EGR) passage (not shown). The EGR passage can be connected to the exhaust passage upstream of the turbine 40b to the intake passage 36 downstream of the intake air throttle 42. Alternatively or additionally, a low pressure EGR system (not shown) can be provided downstream of turbine 40b and upstream of compressor 40a. An EGR valve can be provided for regulating the EGR flow through the EGR passage. The EGR passage can be further provided with an EGR cooler and a bypass around the EGR cooler.

The aftertreatment system 52 may include one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment system 52 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT) etc. The reduction catalyst can include any suitable reduction catalysts, for example, a urea selective reduction catalyst. The particulate matter filter can be a diesel particulate filter (DPF), a partial flow particulate filter (PFF), etc. A PFF functions to capture the particulate matter in a portion of the flow; in contrast the entire exhaust gas volume passes through the particulate filter.

The arrangement of the components in the aftertreatment system 52 can be any arrangement that is suitable for use with the engine 12. For example, in one embodiment, a DOC and a DPF are provided upstream of a SCR device. In one example, a reductant delivery device is provided between the DPF and the SCR device for injecting a reductant into the exhaust gas upstream of the SCR device. The reductant can be urea, diesel exhaust fluid, or any suitable reductant injected in liquid and/or gaseous form.

The exhaust passage 46 can further include a hydrocarbon (HC) injector 60 that is provided downstream of turbine 40b and upstream of aftertreatment system 52. The HC injector 60 can inject hydrocarbons, which can be, for example, fuel from fuel tank 32 or a secondary storage source of hydrocarbons. The hydrocarbons can be from any suitable hydrocarbon containing fluid or a reformate. In one embodiment, the injection of the hydrocarbons can increase the temperature of the exhaust gas through oxidation of the injected hydrocarbons across a DOC and the concomitant release of energy. In one example, injection occurs when the DOC is sufficiently above the light-off temperature of the hydrocarbons to maintain hydrocarbon slip past the DOC below an acceptable level.

The engine 12 is controlled by an engine controller 80. The engine controller 80 performs all of the control functions described herein such as computing the pilot fuel mass and the injection timing of the pilot fuel mass. The controller 80 can include, for example, a processor, a memory, a clock, and an input/output (I/O) interface. The memory may be any type of memory, including volatile or non-volatile memory. The memory can include a non-transitory computer-readable medium on which instructions for performing the methods shown in FIG. 8, and all other methods and functions disclosed herein, can be stored. The term "non-transitory computer-readable medium" can include a single medium or multiple media that store instructions, and can include any mechanism that stores information in a form readable by a computer, such as read-only memory (ROM), random-access memory (RAM), erasable programmable memory (EPROM and EEPROM), or flash memory.

The system 10 includes various sensors such as an intake manifold pressure/temperature sensor 70, an exhaust manifold pressure/temperature sensor 72, one or more aftertreatment sensors 74 (such as a differential pressure sensor, temperature sensor(s), pressure sensor(s), constituent sensor(s)), engine sensors 76 (which can detect the air/fuel ratio of the air/fuel mixture supplied to the combustion chamber, a crank angle, the rotation speed of the crankshaft, etc.), and a fuel sensor 78 to detect the fuel pressure and/or other properties of the fuel, common rail 38 and/or fuel injector 26. Any other sensors known in the art for an engine system are also contemplated.

System 10 can also include various actuators for opening and closing the intake valves 22, for opening and closing the exhaust valves 24, for injecting fuel from the fuel injector 26, for injecting hydrocarbons from the HC injector 60, for opening and closing the wastegate valve 56, for the intake air throttle 42, and/or for the exhaust throttle 58. The actuators are not illustrated in FIG. 1, but one skilled in the art would know how to implement the mechanism needed for each of the components to perform the intended function. Furthermore, in one embodiment, the actuators for opening and closing the intake and exhaust valves 22, 24 is a variable valve actuation (VVA) mechanism 90 such as shown in FIG. 2. Any known VVA mechanism for controlling the opening and closing timing of the intake valves 22 and/or exhaust valves 24 is contemplated for VVA mechanism 90.

Figure 8:
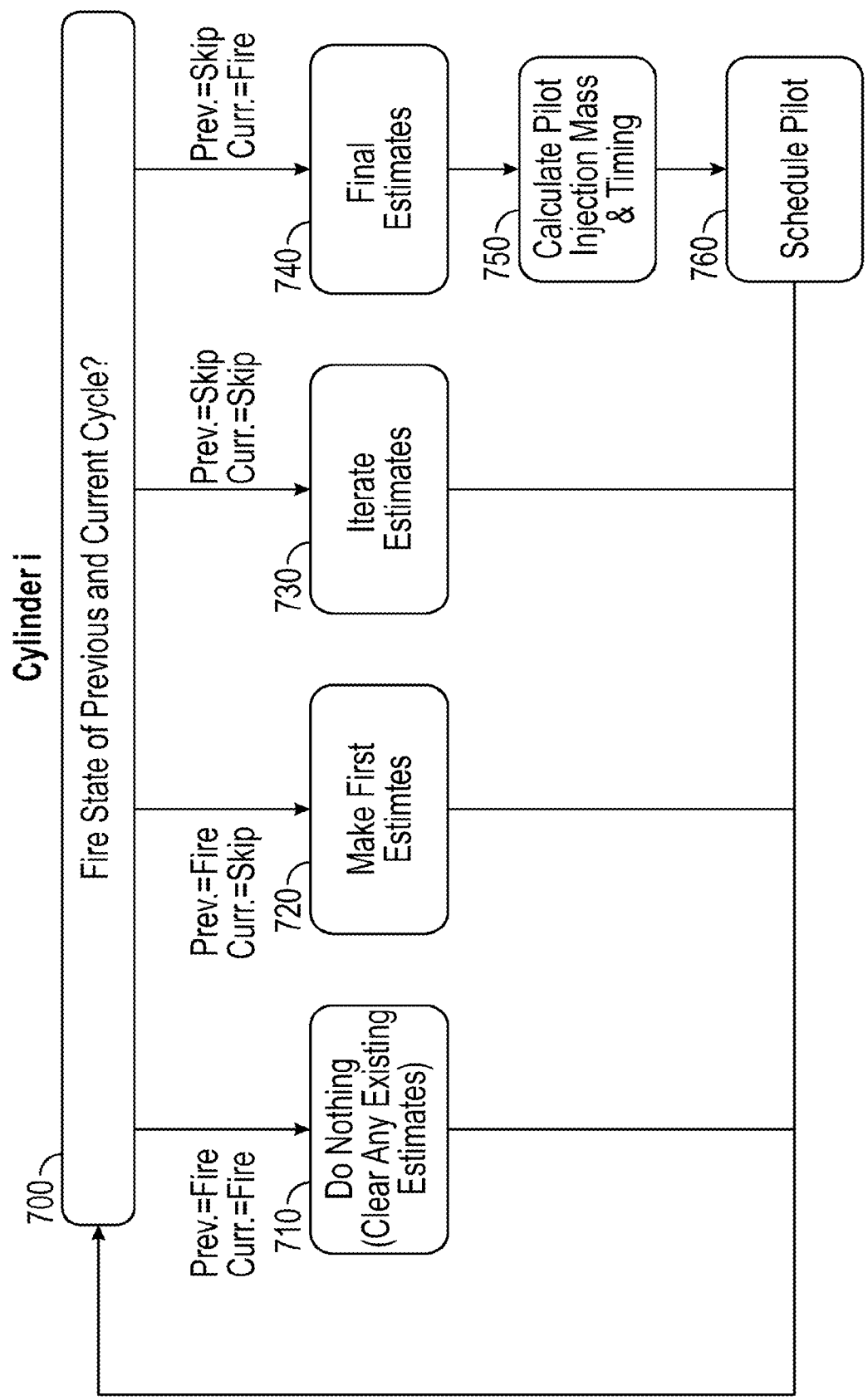
FIG. 8 shows a flowchart of a method of computing the pilot mass injection.

During operation of the engine, the controller 80 can receive information from the various sensors listed above through the I/O interface, process the received information using the processor based on an algorithm stored in the memory, and then send command signals to the various actuators through the I/O interface to implement the disclosed pilot mass injection strategies during operation of the engine. For example, the controller 80 can receive measured flow rates from the mass airflow sensor and EGR sensor, engine speed, coolant temperature, information regarding the number of skips, temperature input, process the temperature input, and then based on the temperature input and send one or more command signals to one or more actuators to control the pilot mass injection, such as shown in FIG. 8.

The engine 12 can be any type of engine that is capable of selectively operating at full displacement or one or more reduced displacements. In one embodiment, the engine 12 can be skip fire controlled. Skip fire engine control contemplates selectively skipping the firing of certain cylinders 14 during selected firing opportunities. Thus, for a given effective engine displacement that is less than the full displacement, a particular cylinder 14 may be successively fired during one firing opportunity, skipped during the next firing opportunity and then selectively skipped or fired during the next firing opportunity. From an overall engine perspective, skip fire control sometimes results in successive engine cycles having a different pattern of skipped and fired cylinders. This is contrasted with conventional variable displacement engine operation in which a fixed set of the cylinders are deactivated during certain low-load operating conditions. The firing sequence may also be expressed as a firing fraction or firing density, either of which indicates a ratio of fired firing opportunities to total firing opportunities.

With skip fire control, a much finer or refined engine control is possible than with conventional variable displacement engines. By way of comparison, fractions such as ⅓ may be implemented using skip fire engine control, but cannot be implemented with a conventional 4-cyclinder variable displacement engine. For instance, a commercially available skip fire controller provides for seventeen (17) different firing fractions, each indicative of a different reduced effective engine displacement.

Skip fire engine control is described in U.S. Pat. Nos. 7,954,474; 7,886,715; 7,849,835; 7,577,511; 8,099,224; 8,131,445; 8,131,447; 8,616,181; 8,701,628; 9,086,020; 9,120,478; 9,200,587; 9,650,971; 9,328,672; 9,239,037; 9,267,454; 9,273,643; 9,664,130; 9,945,313; and 9,291,106, each of which is incorporated herein by reference in its entirety for all purposes.

With certain implementations of skip fire engine control, a decision to fire or not fire (skip) a given cylinder of an engine is made dynamically, meaning on a firing opportunity-by-firing opportunity or an engine cycle by engine cycle basis. In other words, prior to each successive firing opportunity or engine cycle, a decision is made to either fire or skip the firing opportunity or each firing opportunity in an engine cycle. In various embodiments, the firing sequence is determined on a firing opportunity by firing opportunity basis by using a sigma delta, or equivalently a delta sigma, converter. Such a skip fire control system may be defined as dynamic skip fire control or "DSF." For more details on DSF, see U.S. Pat. Nos. 7,849,835, 9,086,020 and 9,200,575, 10,247,121, each incorporated by reference herein for all purposes.

As used herein the term "firing fraction" should thus be broadly interpreted and is applicable to any type of variable displacement engine, including but not limited to, conventional variable displacement engines, skip fire controlled engines and DSF controlled engines.

The present application is described primarily in the context of a six-cylinder internal combustion engine suitable for use in motor vehicles. It should be understood, however, that the present application as described herein may be used with any type of internal combustion engine, regardless of the type of combustion and/or may be used with any engine regardless of the number of cylinders, including 1, 2, 3, 4, 5, 6, 8, 10, 14, 16, 18 cylinders or engines with more or fewer cylinders than specifically recited herein. In addition, the internal combustion engine may use any type of combustible fuel, including but not limited to gasoline, diesel, ethanol, methanol, natural gas, or any combination thereof. Furthermore, the internal combustion engine may rely on various types of combustion and/or fuel charges, including but not limited to compression ignition, spark ignition, a stratified fuel charge, a homogeneous fuel charge, and a partial homogeneous charge. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders in an internal combustion engine.

Figure 3:
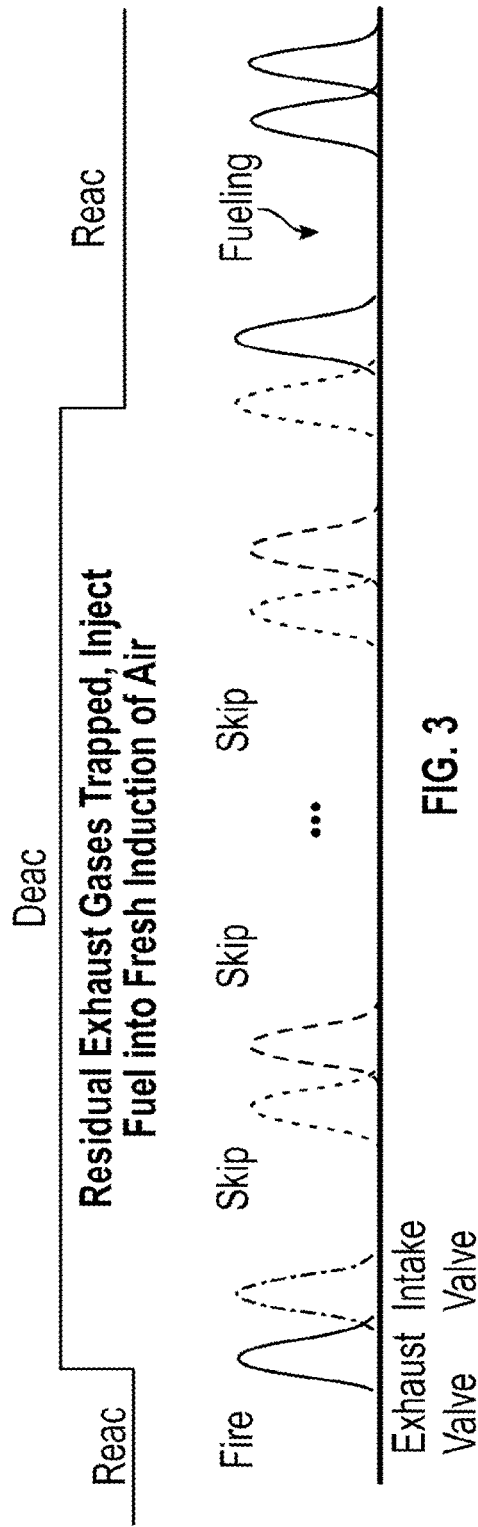
FIG. 3 shows a typical low pressure exhaust spring (LPES) reactivation.
Figure 4:
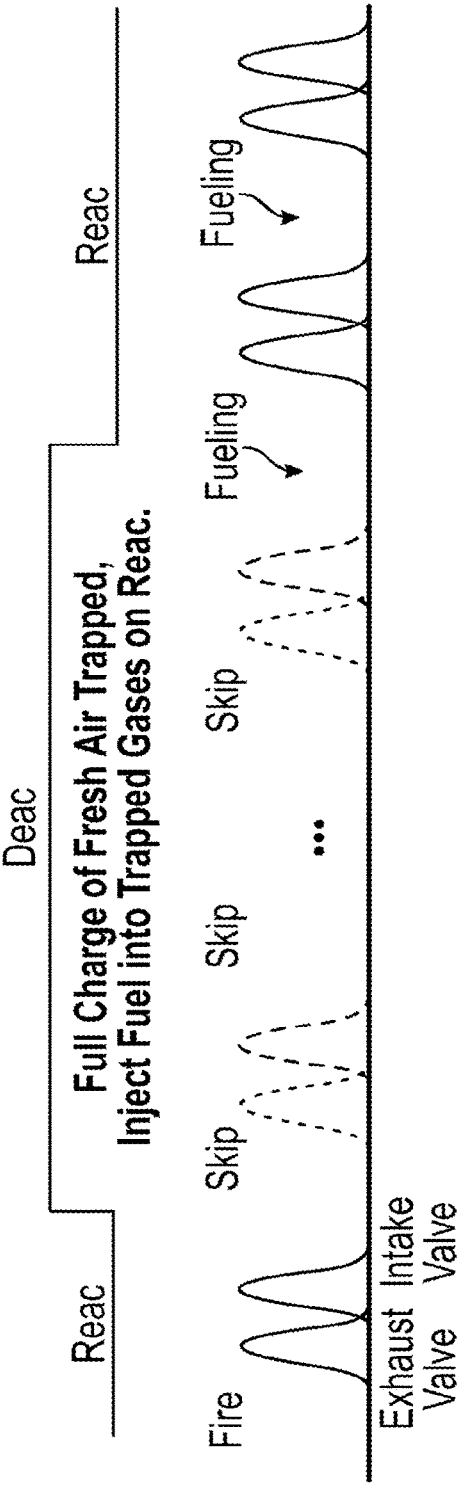
FIG. 4 shows a typical air spring (AS) reactivation.
Figure 5:
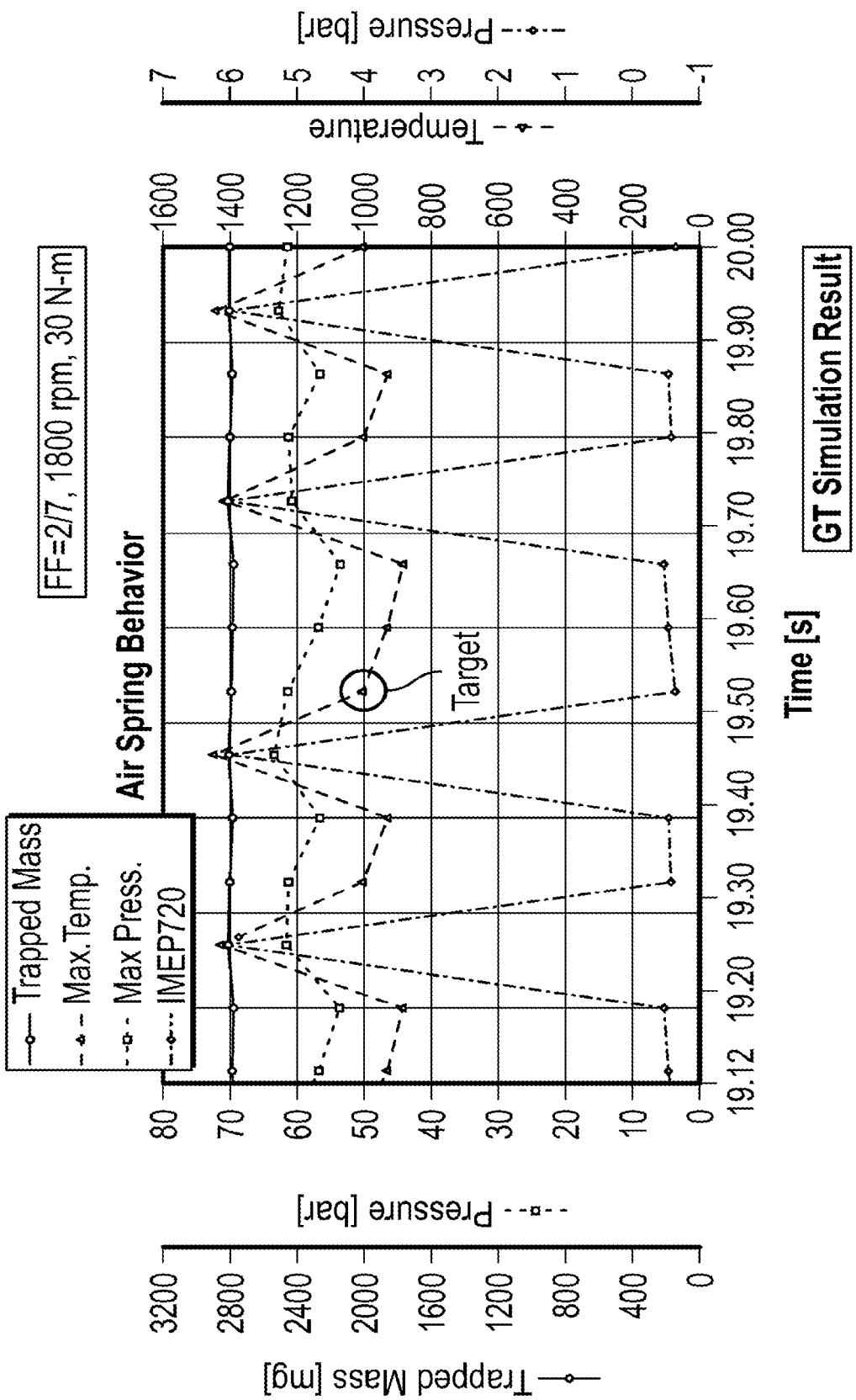
FIG. 5 shows a simulation of the effect of temperature drop on combustion.

The skipped cylinders can be operated as one of several types of pneumatic springs, such as Low Pressure Exhaust Springs (LPES), High Pressure Exhaust Springs (HPES) and Air Springs (AS), as shown in U.S. Pat. No. 10,619,584, which is hereby incorporated by reference in its entirety. FIGS. 3-5 in U.S. Pat. No. 10,619,584 are for a naturally aspirated engine. These graphs will be somewhat different for a boosted engine. In general, LPES operation has the lowest pressure, followed by AS operation and HPES operation. HPES operation only gets to sub atmospheric pressures with very long deactivation periods.

As shown in FIG. 3, during skip fire control of diesel engine 12, after a combustion event in the cylinder, the exhaust valve can be opened to exhaust the hot exhaust gases from the cylinder. During LPES operation, the intake valve is not opened after the hot exhaust gases are exhausted from the cylinder so that no intake is performed (i.e., the intake valve remains closed). At this point, only a small amount of the exhaust gases remains in the cylinder (e.g., approximately 5%). During subsequent skip cycles, the exhaust valve and the intake valve remain closed (deactivated) so that no fueling or air intake is performed. The exhaust gas that remains in the cylinder is then repeatedly expanded and compressed over the skipped cycles. In a representative, example, the pressure in the cylinder can decrease from approximately an ambient pressure, or a low bar (e.g., 3 bars) to a low pressure (e.g., less than 1 bar) due to leakage in the cylinder, heat transfer with the cylinder walls, etc. During these skip cycles, the temperature decreases. When the cylinder is re-fired again, fresh air and EGR intake is performed before the fueling, as shown in FIG. 3. However, successive skips may lead to expansion to a vacuum, which could cause oil consumption problems or ring pack issues. Also, this air intake before fueling causes a slight delay (i.e., at least one full cycle), which might not be optimal if increased power is desired quickly.

Another option is to perform air spring (AS) reactivation, in which after the combustion event and after the hot exhaust gases are exhausted from the cylinder, the intake valve is opened so that intake air and EGR are introduced to the cylinder, as shown in FIG. 4. At this point, a full charge of intake air and EGR are trapped in the cylinder. During subsequent skip cycles, this intake air and EGR are repeatedly expanded and compressed with the exhaust valve and the intake valve closed over the skipped cycles during which the pressure in the cylinder varies between high pressure and ambient/intake pressure. When the cylinder is re-fired again, because air is already in the cylinder, only fuel can be injected into the cylinder. However, each successive skip can cause increased degradation in combustion, which can lead to misfires after several skips (e.g., 3 or more skips). One way to prevent this degradation in combustion could be to add fresh air before refueling in order to recharge the cylinder. However, this would require the cylinder to be exhausted before bringing in the fresh air, which would push cold exhaust gases to the exhaust system, which can counteract the benefit of DSF. For a large number of skips (e.g., 50 skips), this might not be a problem. However, for a small number of skips (e.g., 2 skips), a significant percentage of the exhaust flow would be cold gases.

FIG. 5 shows some data from a simulation of a diesel engine operating in an air spring (AS) mode with a firing fraction (FF) of 2/7, which means that over the course of seven (7) engine cycles, the cylinder is fired two (2) times. Specifically, in FIG. 5, the firing pattern is FSSFSSS. In this configuration, it can be difficult to achieve successful combustion. Specifically, in the skipped cylinders, only a small fraction of the fuel is successfully converted into work output. One reason for this is that for each skip the temperature of the gases in the cylinder can drop approximately 50-60 degrees Kelvin. These successive drops in temperature make it difficult to have efficient combustion. Specifically, as the temperature decreases, the amount of time required for the ignition and combustion to occur increases. Compounding this problem is the fact as the combustion event is commencing, the piston is moving away from top-dead-center, which further cools the gases in the cylinder, further delaying the start of ignition. Another problem that occurs is that some of the gas in the cylinder can flow past the ring pack into the crank case, which decreases the amount of mass in the cylinder for each skip. The net result is that the work output becomes low, or even negative.

In order to compensate for this temperature, drop, a small pilot mass can be added to the skipped cylinder before injection of the main fuel injection in order to raise the temperature in the cylinder to a temperature that creates good combustion, such as 1000 degrees Kelvin. The pilot injection mass is injected at a time when there is sufficient time to mix and burn the fuel before the main fuel is injected. For example, if the main fuel is injected 5 degrees before top dead center, the pilot mass can be injected 25 degrees before top dead center. The timing for the injection of the pilot depends on various factors such as how much fuel you need for the pilot mass, the current gas temperature, the difference between the current gas temperature and the desired gas temperature, the engine speed, the in-cylinder gas density, the fuel rail pressure, the total number of pilot injections, etc. The pilot injection timing could be determined such that the end of the pilot injection is a specified number of crank angle degrees before the start of the main injection, such as 10 degrees. The separation between the pilot and main injections is chosen to achieve oxidation of the pilot fuel before the start of the main injection. If the pilot injection mass becomes sufficiently large, the pilot injection may be separated into two or more pilot injections with different injection timings. Also, the timing or timings could be a fixed value or values, such as 15 degrees before top dead center for a single pilot injection or 35 degrees and 15 degrees before top dead center for two pilot injections.

Figure 6:
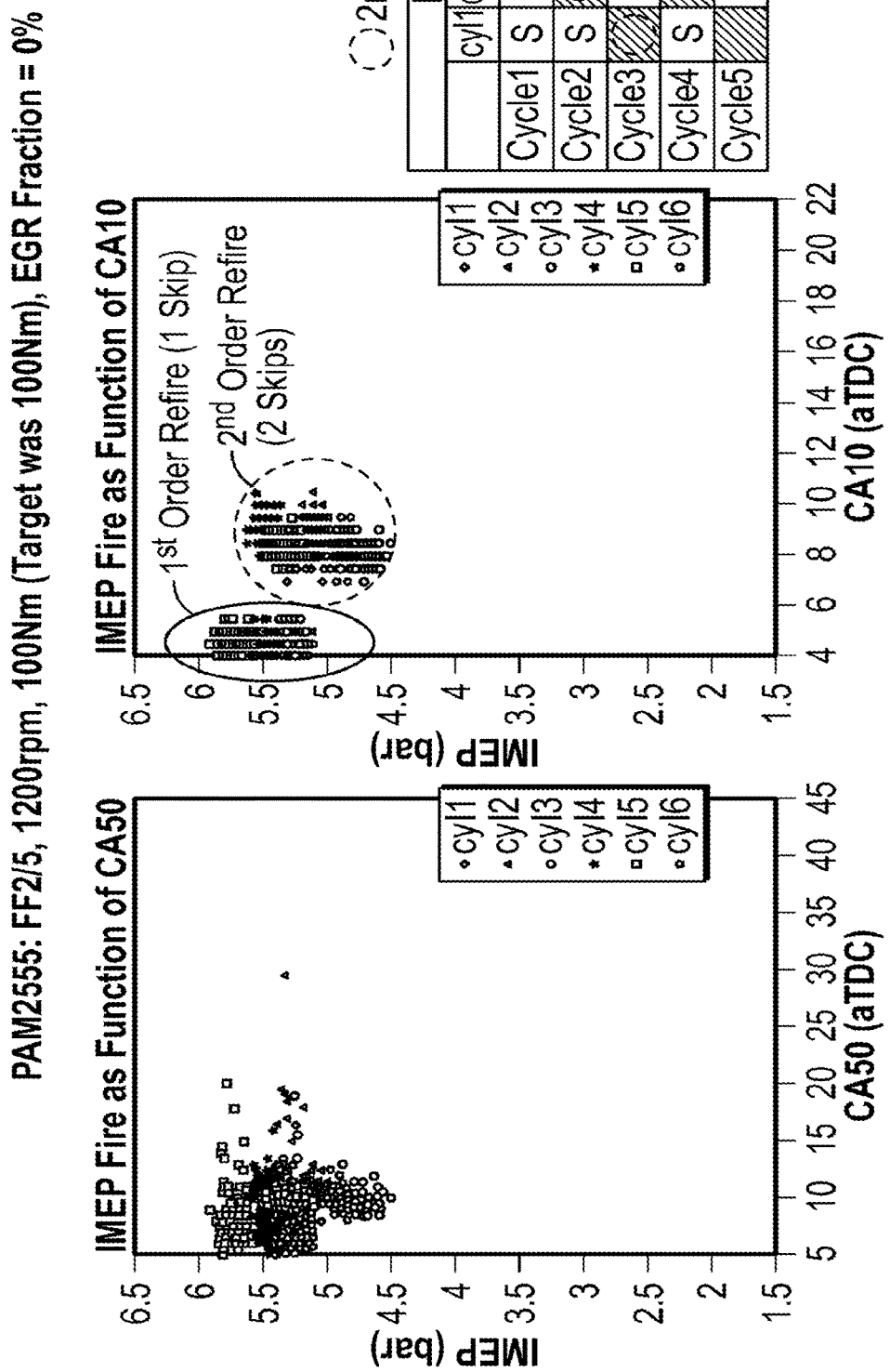
FIG. 6 shows a graph of the amount of work created by the fuel vs. the speed of the ignition process for cylinders that are skipped in a firing fraction (FF) of ⅖.

FIG. 6 shows a graph of the amount of work created by the fuel versus the speed of the ignition process for cylinders that are skipped in a firing fraction (FF) of 2/5 with only a main injection. Specifically, the vertical axis is the mean effective pressure (IMEP), which indicates how efficiently the fuel is converted to work. The horizontal axis is the time/crank angle at which 10% of the fuel is burned. During a firing fraction of ⅖, the cylinder is fired two times for every five firing opportunities. The group of points in the solid oval are the data points for a first order re-fire (i.e., the firing occurs after skipping for one cycle). The group of points in the dashed circle are the data points for a second order re-fire (i.e., the firing occurs after skipping for two cycles). As shown in FIG. 6, the IMEP is lower and the combustion becomes more delayed for a second order re-fire. As the number of skips increases, the amount of work created by the fuel continues to decrease (i.e., lower IMEP) and the ignition time increases (i.e., slower ignition). With the EGR valve closed, the combustion stability can be improved.

It is therefore desirable to prevent this decrease in IMEP and increase ignition time that occurs in skipped cylinders (i.e., move the points to the upper left in FIG. 6). One way to do this is to add a small quantity of fuel before the main injection mass, which will burn and increase the gas temperature in the cylinder to an acceptable level for the main injection. Sufficient time should be given for the pilot mass to mix and burn before the main injection is done. One option is to use an offset between the end of the pilot injection and the start of the main injection, as shown below in Equation (1):

Start of Pilot Injection=(Start of Main Injection)–(Offset)–(Duration of Pilot Injection)    Equation (1)

The duration of the pilot injection can be determined by injector characteristics, fuel rail pressure, and pilot injection mass. The offset is chosen to ensure sufficient time for pilot fuel oxidation before the main injection. The offset could be a function of engine speed, gas temperature, gas density, fuel rail pressure, etc.

The amount of the pilot injection mass to attain a desired temperature can be calculated by using the principle of conservation of energy of the cylinder gases and fuel chemical energy. Specifically, the mass of the pilot injection can be calculated as shown in Equation (2) below:

$m\_charge * c\_p * (T\_desired - T\_estimated) = m\_fuel, pilot * LHV\_fuel * \eta\_comb$    Equation (2)

Re-arranged for pilot fuel mass:

$m\_fuel, pilot = [m\_charge * c\_p * (T\_desired - T\_estimated)] / [LHV\_fuel * \eta\_comb]$    Equation (3)

where
m_charge=current mass in cylinder
c_p=specific heat capacity
T_desired=desired TDC/SOI temperature
T_estimated=estimated TDC/SOI temperature without pilot
m_fuel,pilot=pilot fuel mass
LHV_fuel=fuel lower heating value
η_comb=pilot combustion efficiency (how much of the fuel chemical energy gets converted into temperature)

These computations of Equations (1), (2) and (3) could be done by the engine controller 80 (see FIG. 1). In at least one embodiment, virtual sensors and/or physical sensors can be used to measure some of these variables. As shown in Equation (2), the key parameter in computing the amount of the pilot injection mass is the difference between the desired temperature and the estimated temperature at top dead center and/or start of ignition (TDC/SOI). A single zone model could be used to compute the estimated and desired temperatures by physically simulating the contents of the cylinder as they get compressed and expanded and how they interact with wall heat transfer and blowby or gas exchange with the crankcase. The single zone model could be calibrated to accurately represent the cylinder 14 behavior. The desired temperature could be the value when the cylinders are firing all of the time (i.e., the desired temperature for the first skip) or could be a temperature at which stable combustion is expected. Alternatively, the temperature difference between the desired and estimated temperatures could be computed instead of computing the desired and estimated temperatures separately. The temperature difference could be calculated as the temperature drop per skip multiplied by the number of consecutive skips on the target cylinder. A look-up table could be used to determine the temperature drop per skip based on engine parameters such as elevation, engine speed, coolant temperature, etc. Another option is to assume a fixed temperature drop per skip (e.g., 50 K per skip) and use that to compute the difference between desired temperature and estimated temperature based on the number of skips. This lookup table and fixed value could be determined through testing and/or engine simulation.

For η_comb, a high number such as 99% could be assumed. The value for η_comb may depend on the pilot injection timing relative to the main start of injection, the local in-cylinder conditions, etc. Or, other values for different operating conditions such as cold start could be used. Also, a look-up table that quantifies how a pilot mass burns vs. engine speed/EGR amount/coolant temperature could be used. Or, a physics based model could be used.

The value of m_charge, the current mass in cylinder, can be determined by the ECU, which can include a real or virtual sensor that can give a value for m_charge, such as a mass air flow sensor, an EGR sensor, estimates or volumetric efficiency estimates, etc. Also, a volumetric efficiency estimation with measured intake manifold temperature/pressure, air flow and EGR flow measurements could be used. The trapped mass in the cylinder may change during skips due to blowby. This effect for each skip can be accounted for using a model or calibration. For the air spring trapping strategy, blowby can reduce the cylinder trapped mass by about 0.5% per cycle. So, for a second order refire (2 skips), blowby can reduce the trapped mass by about 1%. A constant value could be used for the specific heat capacity (c_p) since it won't change too much for the conditions in the cylinder near top dead center. Alternatively, an estimate of the chemical composition could be calculated using the air, fuel and EGR rates and this estimate could be used to look up a c_p for each species. The gas composition estimate also could account for change with crankcase gas exchange. Also, a weighted average of air in EGR could be used. Also, the heat capacity could be evaluated at some nominal gas temperature, such as (T_desired+T_estimated)/2. For the fuel lower heating value (LHV_fuel), a constant value for diesel fuel can be used.

The estimated TDC temperature without pilot can be estimated. One method would be to use the ideal gas law, $P = \rho R T \rightarrow T = P/(\rho R)$ where ρ is the gas density and P is the pressure. The gas density can be determined as the trapped mass (already estimated/calculated) divided by the cylinder volume at some desired crank angle (e.g. TDC, SOI). The gas constant R=Ru/MW (Ru=universal gas constant, MW=molecular weight of gas mixture) can be determined from the gas composition estimate used for the heat capacity. The pressure (P) needs to be estimated at the same crank angle at which the cylinder volume is evaluated. The pressure estimation could be done with a physics-based model that accounts for heat transfer to the walls, blowby, and other physical effects.

The desired TDC temperature would be the TDC temperature for the first compression of the air spring, or the same conditions if there were no skips. The desired temperature could also be some other temperature where combustion performance/ignition delay would be acceptable. Alternatively, the difference (T_desired−T_estimated) could be simplified to be proportional to the number of skips, e.g. 50*(number of skips). FIG. 7 shows some of the methods that can be used to calculate the variables in Equation (2).

The calculation of the pilot mass injection, as presented above, can be done during the operation of the engine based on the current conditions of the engine. Alternatively, calibrated values could be used for anticipated engine conditions. That is, the pilot injection mass could be pre-computed for all engine speeds, charge flows, intake charge temperatures, consecutive skip numbers, etc. expected to be encountered in operation. Then, these pre-computed pilot injection mass values can be looked up during operation based on the current operating conditions.

The pilot injection fuel will provide additional torque. So, once the amount of pilot mass is determined, the main injection amount can be adjusted as shown below in Equation (4) so that the amount of engine output remains the same by taking into account the amount of torque produced by the pilot mass.

$$m\_\text{fuel,main,corrected}=(Trq\_\text{total}-Trq\_\text{pilot})*(\text{Torque to Fuel Conversion Factor})$$

where, $$Trq\_\text{pilot}=m\_\text{fuel,pilot}/(\text{Torque to Fuel Conversion Factor}) \quad \text{Equation (4)}$$

The torque to fuel conversion factor could be a function of fuel injection timing, fuel mass, engine speed, elevation, etc.

Also, if the mass of the pilot mass injection exceeds a threshold, it could be split into multiple pilot mass injections. If multiple pilot mass injections are used, the timing of the multiple injections could be scheduled using offsets as presented above in Equation (1). A command separation space between pilots could be used to determine time between end of $1^{st}$ pilot and start of $2^{nd}$ pilot (separation space). Alternatively, one could command an absolute crank angle for the start of 1st and start of $2^{nd}$. Care should be taken to prevent the $1^{st}$ pilot from running into the $2^{nd}$ for example in the case when the $1^{st}$ pilot is too large. If there are multiple pilot mass injections, the torque created by each pilot mass should be calculated.

One method of computing the pilot mass injection is shown in the flowchart of FIG. 8. This method shown in FIG. 8 is done separately for each cylinder. As shown in FIG. 8, in the first step in the flowchart (Step 700), the fire state of the current and previous cycle for each cylinder (cylinder i) are checked. When the fire state of the current and previous cycle in cylinder i is "fire," then nothing is done and the previous estimates are cleared (Step 710). Flow then returns to Step 700. When cylinder i first starts to skip (i.e., the fire state of the previous cycle of cylinder i is "fire" and the fire state of the current cycle of cylinder i is "skip"), the first estimates of m_charge, c_p, T_desired, T_estimated, LHV_fuel, and n_comb for cylinder i are made (Step 720). Flow returns to Step 700. In the next cycle, if cylinder i continues to skip (i.e., the fire state of the previous cycle and current cycle of cylinder i is "skip"), then the estimates of m_charge, c_p, T_desired, T_estimated, LHV_fuel, and n_comb are iterated (Step 730). Flow then returns to Step 700. In the next cycle, if cylinder i is commanded to fire (i.e., the fire state of the previous cycle of cylinder i is "skip" and the fire state of the current cycle of cylinder i is "fire"), then the final estimates of m_charge, c_p, T_desired, T_estimated, LHV_fuel, and n_comb are computed (Step 740). Then, at Step 750, the pilot injection mass is computed, as well as the timing of the injection of the pilot mass. The timing of the pilot injection is chosen to achieve oxidation of the pilot fuel before the main injection. The pilot injection timing could be chosen using a specified offset between the end of the pilot injection and the start of the main injection, as in Equation 1. The offset could be a function of engine speed, gas temperature, gas density, fuel rail pressure, etc. At Step 760, the pilot injection mass is injected into cylinder i. Control then returns to Step 700.

When a misfire is detected, additional action can be taken, such as advance the pilot timing or add to the pilot mass value for future injection events in order to prevent future misfires. Such learned adaptation in the pilot fuel injection mass and timing mitigates errors in the base method or calibration. One method could be to increment an adder fuel mass when a misfire is detected in a given condition described by engine speed, engine load, and firing fraction. The final pilot injection mass is the base pilot fuel mass plus the adder fuel mass. If additional misfires are detected at that condition, the adder mass is incremented further. If no misfires are detected for a sufficiently long period of time at that condition, the adder mass can be reduced. A similar adder approach could be taken for advancing the pilot injection timing.

The radicals/species present from partially-oxidized pilot fuel may help decrease the ignition delay. In this case, an additional correction factor could be used to lower the pilot injection mass needed. For instance, as shown below in Equation (5):

$$m\_\text{fuel,pilot}=([m\ \text{charge}*c\_p*(T\_\text{desired}-T\_\text{estimated})]/[LHV\_\text{fuel}*\eta\_\text{comb}])*\eta\_\text{chem} \quad \text{Equation (5)}$$

where x_chem is the chemical enhancement factor of the radical/partially-oxidized species.

As an example, for FF=2/7 at 1800 rpm, 30 N-m in a 6-cylinder, 15 L diesel engine, this pilot injection compensation method is estimated to use 5-15% of the total fueling as m_fuel,pilot. The pilot fuel is not converted to torque as efficiently as the main fuel, so the increase in pilot fueling could be viewed as a fuel penalty. However, this fuel "penalty" is beneficial because it helps enable stable combustion and thus the use of FF=2/7 for the turbine outlet temperature benefits at an operating condition where it may not have been possible without the pilot injection. Additionally, the addition of pilot fuel is sufficiently small for FF=2/7 that the total fuel consumption will still be lower than the equivalent operation with all cylinders (i.e., FF=1). That is, the additional pilot fuel would reduce fuel savings for FF=2/7 at this operating condition from 25% (ideal case with no combustion stability issues)→10-20% (accounting for pilot injection mass). The ideal case is not achievable in practice due to combustion stability issues and the operation may not be possible without the pilot injection due to misfire.

It should be understood that the invention is not limited by the specific embodiments described herein, which are offered by way of example and not by way of limitation. Variations and modifications of the above-described embodiments and its various aspects will be apparent to one skilled in the art and fall within the scope of the invention, as set forth in the following claims.

What is claimed is:

1. A method of operation of a cylinder of an internal combustion engine, the method comprising:

determining a mass of a pilot injection based at least partially on operating conditions of the cylinder;

injecting, with a fuel injector, the pilot injection into the cylinder during an engine stroke; and injecting, with the fuel injector, a main injection into the cylinder after injecting the pilot injection during the same engine stroke as injecting the pilot injection.

2. The method of claim 1, further comprising:

skipping the cylinder before determining the pilot injection; and firing the cylinder after injecting the main injection.

3. The method of claim 1, wherein determining the mass of the pilot injection based at least partially on the operating conditions of the cylinder includes determining a number of skipped cycles for the cylinder.

4. The method of claim 1, wherein determining the mass of the pilot injection based at least partially on the operating conditions of the cylinder includes determining a temperature difference between a desired temperature of the cylinder and an estimated temperature of the cylinder.

5. The method of claim 1, wherein injecting the main injection into the cylinder includes determining a timing for the injection of the pilot injection such that an end of injecting the pilot injection is a specified number of crank angle degrees before injecting the main injection into the cylinder.

6. The method of claim 1, wherein determining the mass of the pilot injection includes the mass of the pilot injection exceeding a threshold size and splitting the pilot injection into a first pilot injection and a second pilot injection, wherein injecting the pilot injection into the cylinder includes injecting the first pilot injection and injecting the second pilot injection after injecting the first pilot injection.

7. The method of claim 1, further comprising reducing a size of the main injection based at least partially on the mass of the pilot injection before injecting the main injection into the cylinder.

8. The method of claim 1, wherein injecting the main injection into the cylinder occurs after a predetermined amount of time after injecting the pilot injection such that the pilot injection is ended before the injecting the main injection.

9. The method of claim 8, further comprising selecting the predetermined amount of time to achieve oxidation of fuel of the pilot injection before injecting the main injection.

10. An engine controller for an internal combustion engine, the engine controller configured to:

determine a mass of a pilot injection based at least partially on operating conditions of a cylinder;

inject, with a fuel injector, the pilot injection into the cylinder during an engine stroke; and inject, with the fuel injector, a main injection into the cylinder after injecting the pilot injection during the same engine stroke as the pilot injection is injected.

11. The engine controller of claim 10, wherein the engine controller is further configured to:

skip the cylinder before determining the mass of the pilot injection; and fire the cylinder after injecting the pilot injection.

12. The engine controller of claim 10, wherein determining the mass of the pilot injection based at least partially on the operating conditions of the cylinder includes determining a number of skipped cycles for the cylinder.

13. The engine controller of claim 10, wherein determining the mass of the pilot injection based at least partially on the operating conditions of the cylinder includes determining a temperature difference between a desired temperature of the cylinder and an estimated temperature of the cylinder.

14. The engine controller of claim 10, wherein injecting the main injection into the cylinder includes determining a timing for the injection of the pilot injection such that an end of injecting the pilot injection is a specified number of crank angle degrees before injecting the main injection into the cylinder.

15. The engine controller of claim 10, wherein determining the mass of the pilot injection includes the mass of the pilot injection exceeding a threshold mass and splitting the pilot injection into a first pilot injection and a second pilot injection, wherein injecting the pilot injection into the cylinder includes injecting the first pilot injection and injecting the second pilot injection after injecting the first pilot injection.

16. The engine controller of claim 10, wherein the engine controller is further configured to reduce a size of the main injection based at least partially on the mass of the pilot injection before injecting the main injection into the cylinder.

17. The engine controller of claim 10, wherein injecting the main injection into the cylinder occurs after a predetermined amount of time after injecting the pilot injection.

18. The engine controller of claim 17, wherein the engine controller is further configured to select the predetermined amount of time to achieve oxidation of fuel of the pilot injection before injecting the main injection.

19. A non-transitory, computer-readable medium having instructions recorded thereon which, when executed by a processor, cause the processor to:

determine a mass of a pilot injection based at least partially on operating conditions of a cylinder;

inject, by a fuel injector, the pilot injection into the cylinder during an engine stroke; and inject, by the fuel injector, a main injection into the cylinder after injecting the pilot injection during the same engine stroke.

20. The non-transitory, computer-readable medium of claim 19, wherein determining the mass of the pilot injection based at least partially on the operating conditions of the cylinder includes determining a number of skipped cycles for the cylinder.

21. The non-transitory, computer-readable medium of claim 19, wherein determining the mass of the pilot injection based at least partially on the operating conditions of the cylinder includes determining a temperature difference between a desired temperature of the cylinder and an estimated temperature of the cylinder.

22. The method of claim 1, further comprising burning the pilot injection before injecting the main injection into the cylinder.

* * * * *